A. F. DRAPER.
SEAT.
APPLICATION FILED OCT. 8, 1910.

1,114,452.

Patented Oct. 20, 1914.
2 SHEETS—SHEET 1.

Witnesses
Chas. W. Stauffiger
A. M. Dorr.

Inventor
ARTHUR F. DRAPER
By Barthel & ...
Attorneys

A. F. DRAPER.
SEAT.
APPLICATION FILED OCT. 8, 1910.

1,114,452.

Patented Oct. 20, 1914.
2 SHEETS—SHEET 2.

Witnesses
Chas. W. Stauffiger
A. M. Dow

Inventor
ARTHUR F. DRAPER
By Bartheff Bartheff
Attorneys

UNITED STATES PATENT OFFICE.

ARTHUR F. DRAPER, OF DETROIT, MICHIGAN.

SEAT.

1,114,452.

Specification of Letters Patent. Patented Oct. 20, 1914.

Application filed October 8, 1910. Serial No. 585,977.

*To all whom it may concern:*

Be it known that I, ARTHUR F. DRAPER, a subject of the King of Great Britain, residing at Detroit, in the county of Wayne and State of Michigan, have invented certain new and useful Improvements in Seats, of which the following is a specification, reference being had therein to the accompanying drawings.

This invention relates to certain new and useful improvements in seats and more particularly to an arrangement thereof whereby it may be readily folded when not in use, the arrangement of the parts being such that the upholstery may be entirely protected from the elements when not in use and the interior of the seat be available as a locker or tool holder used upon an automobile or motor boat.

The invention consists in the matters hereinafter set forth and more particularly pointed out in the appended claims.

Figure 1:
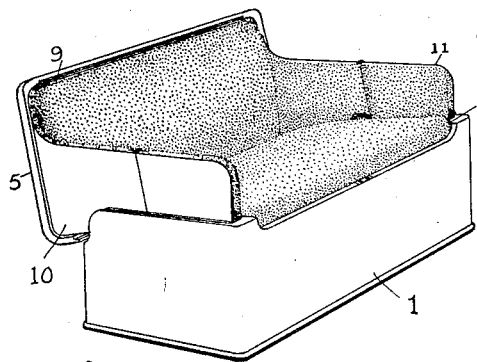
Figure 2:
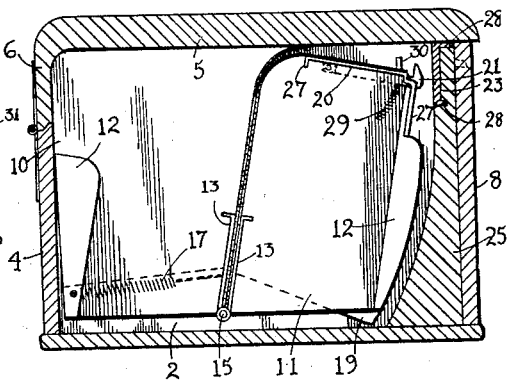
Figure 8:
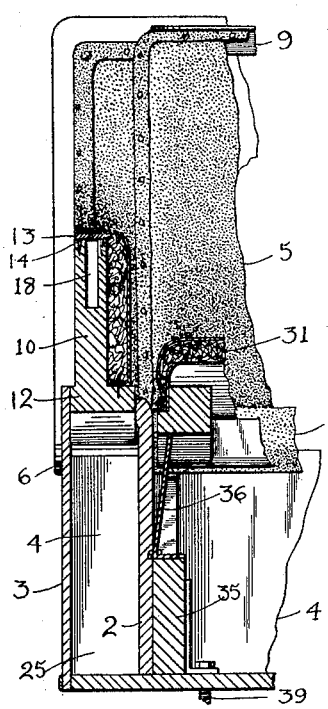
Figure 7:
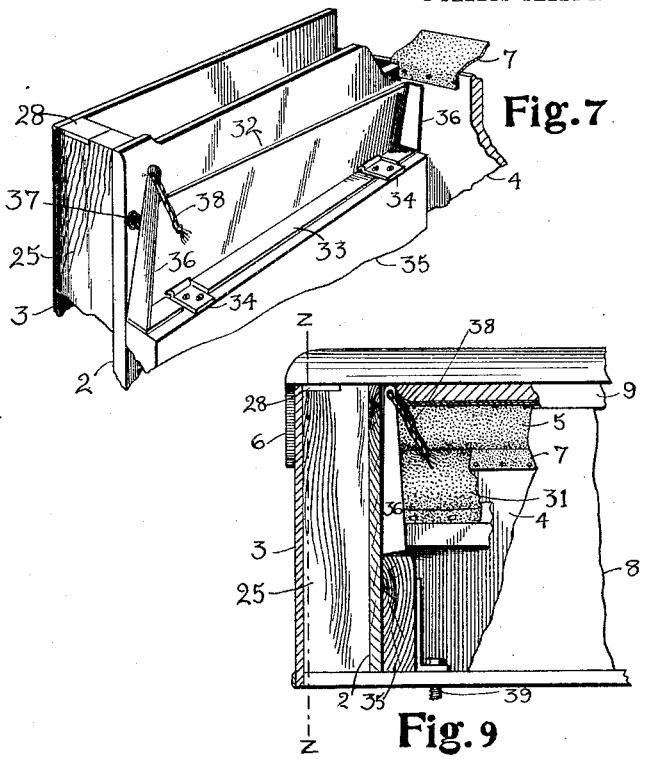
Figure 9:
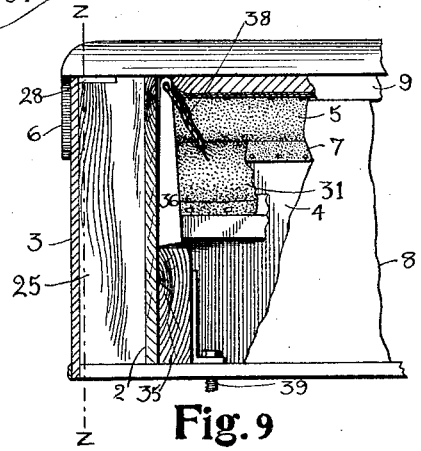
Figure 10:
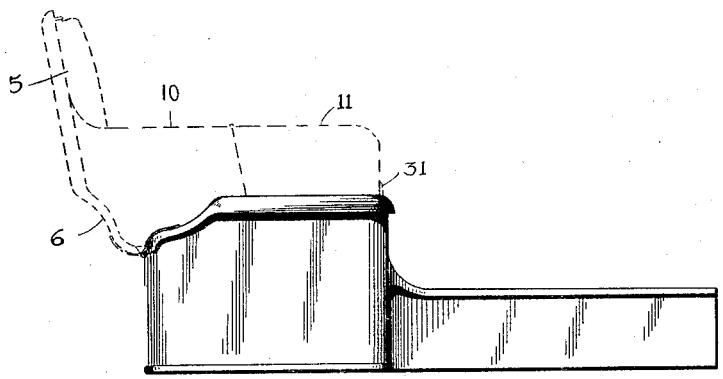

In the drawings, Figure 1 is a view in perspective of a seat that embodies features of the invention showing it in operative position; Fig. 2 is a view in section on the line z—z Fig 9, near one end of the box, showing the seat closed; Fig. 3 is a view in detail of an arm latch; Fig. 4 is a view in detail of a striking plate; Fig. 5 is a view similar to Fig. 2 showing the parts in open position; Fig. 6 is a view in detail of a side arm hinge; Fig. 7 is a view in perspective of a portion of the box in detail showing a seat support and side arm pocket; Fig. 8 is a view of a portion of the box partly in elevation and partly in section on line x—x of Fig. 5; Fig. 9 is a view in elevation partially broken away to show the parts in folded position; and Fig. 10 is a side elevation showing a modified design of seat box as applied to an automobile in which side panels are used to form a forward extension thereof.

Referring to the drawings an outer substantially rectangular box 1 has transverse partitions 2 each spaced at a slight interval from its end walls 3, and a back wall 4 to whose upper edge an upholstered seat back 5 is hinged, that is adapted to form a cover for the box when down. Preferably, the upper margin of the back wall 4, is lower than those of the end walls and the back has an apron indicated at 6 to fill the interval when the cover is down, and to afford greater depth to the seat when the cover is raised and the joint is made dust proof by a flexible guard 7 which also prevents the back from falling over accidentally while being adjusted. The front wall 8 of the box may also be slightly cut away so as not to interfere with the comfort of the occupant, and a filler strip 9 may be placed on the back to compensate for it.

Forwardly projecting panels 10 are rigidly secured to each end of the back. Forwardly projecting extensions 11 are hinged at their rear upper corners to the panels 10 with which they conjointly form arms for the full depth of the seat when the seat is open. The extensions are adapted to fold back on the upper margins of the panels and with the latter to enter the pockets formed between the partitions 2 and end walls 3 when the seat back is turned down as a cover. To prevent the finish on the outside of the seat arms and the upholstering on the inside from rubbing and to stiffen the extended arm, the lower margins have flanges 12 in sliding engagement with the partitions and end walls which normally remain in the pockets in all positions of the parts. Preferably, the hinges connecting the extensions 11 to the panels 10 each consist of a pair of plates 13 with tongues at their outer ends embedded in the members 10 and 11, the inner ends of the plates having hinge sockets pivotally secured by pins 15. Each plate 13 is provided with a longitudinal slot 14 in the outer end of which slot at 16 a spring 17 is pivotally secured, said spring playing in said slot 14 and a gain 18 formed in the body of each panel and extension while being folded, the latter having a tenon 19 likewise entering the gain in the companion panel adjacent the spring to stiffen the construction. The spring tends to keep the joint tight and prevents the accidental displacement of the parts when in an extended position and also holds them in folded relation while being lowered.

To secure the back rigidly in upright position, a latch plate 20 is secured on the forward edge of each extension 11 with a spring pressed keeper 21 adapted to enter a slot 22 in a striking plate 23. The keeper 21 plays in a guide slot 24 in the lower tongue 27 of the latch plate 20 and is slightly wedge-shaped to closely fit the slot 22 in the striking plate 23 and prevent rattling of the parts. The striking plate 23 is preferably secured in the margin of a filler block 25 at the front of the pocket in the box and engages a notch or angle 26 in the latch plate 20 to support the arm. While the latch may be of any suitable type, the preferred construction is that shown herein, with retaining tongues 27 on the latch plate and similar members 28 on the plate 23. 29 indicates a spring to normally hold the keeper in its projected position and 30 is a finger piece on the keeper projecting through the latch plate for releasing the keeper.

A cushion seat 31 is carried in the box, and, when the back is raised, rests at its ends on plates 32. The latter are preferably of sheet metal and each has a base flange 33 preferably inbent at slightly more than right angles to the body of the plate and hinged by suitable means indicated at 34 to the upper edge of a block 35 secured against the inside face of the partition 2. Inturned forward and rear end flanges 36 stiffen the plate. A spring 37 normally projects the plate so that it is tilted slightly from the partition 2 and forms a ledge on which the cushion rests. The forward end flange 36 extends slightly above the edge of the cushion 31 and has a cord 38 or other means whereby the plate may be drawn back against the face of the partition 2 and thereby allow the cushion to drop down on the base flange 33 or upper margin of the blocks 35. The upper edges of the plates may be inclined as shown to give the cushion the proper inclination. The seat back may be modified in design to correspond to the body on which the seat is placed, one such arrangement being shown in Fig. 10. The seat may be attached to the body or frame by bolts 39.

One feature of the construction is the saving of space within the box caused from folding the seat arm members upon themselves in the same plane so that when dropped into the pockets they take up a space equal to the thickness of one arm only. Another feature is the depth of seat obtainable as the apron of the back allows the latter to overhang the rear wall of the box. This also permits the lower edge of the side arms to remain within the pockets when in opened position. By the use of the tongued latch-members and hinges all shearing strain is taken from the screws or other retaining parts. When closed the box forms a good sized receptacle in which articles may be placed without coming in contact with the upholstery as the latter is completely shielded. The transverse partition 2 may be cut away a sufficient depth so as not to interfere with the upholstering or the seat back and side panels when folded.

Obviously changes in the details of construction may be made without departing from the spirit of the invention and I do not care to limit myself to any particular form or arrangement of parts.

I claim as my invention:

1. A seat comprising a box, a seat cushion therein adapted to be supported in both elevated and lowered position, a seat back having a lateral extension hinged at its lower edge to the rear wall of the box and forming a continuation of one of the walls thereof and adapted to form with the seat back a cover for the box when lowered, the back and seat cushion being adapted when both are elevated to form a seat of greater width than the box, and side arms on the cover having hinged sections adapted to be folded on the side arms and to be connected to the box when extended.

2. A seat comprising a box, a seat cushion in elevated and lowered positions at intervals from the bottom of the box and a seat back having a lateral extension pivoted to the box and forming a complementary extension of one of the walls thereof, and adapted to form with the seat back a cover therefor when lowered, the back and seat cushion being adapted when both are elevated to form a seat of greater width than the box, and side arms having folding hinged sections adapted to connect the cover and box.

3. A seat comprising a box, a seat cushion in the box, means for supporting the cushion in elevated position and a seat back having a lateral extension hinged at its lower edge to the rear wall of the box and forming therewith a continuation of said wall, and adapted to form with the seat back a cover for the box when lowered, the back and seat cushion being adapted when both are elevated to form a seat of greater width than the box, and hinged side arms on the cover.

4. A seat comprising a box, a seat cushion in the box, means for supporting the cushion in elevated and lowered position at intervals from the bottom of the box, a seat back having a lateral extension pivoted to the rear wall of the box and adapted with the seat back to form a cover for the box when lowered, the back and seat cushion being adapted when both are elevated to form a seat of greater width than the box, and extensible arms on the back adapted to extend substantially the width of the seat formed by the cushion and back when the back is raised and to lie wholly within the box when the back is lowered.

5. A vehicle seat comprising a box having arm pockets at each end thereof, a seat cushion adapted to be supported in both raised and lowered positions at intervals from the floor of the box and between the pockets, and a seat back having an apron hinged to the box and adapted to form a cover therefor when lowered, the back and seat cushion together constituting when elevated a seat of greater width than the box and the back being provided with arms extending substantially the full width of the seat when the back is raised, and lying wholly within the pockets when the back is lowered.

6. A vehicle seat comprising a box, a transverse partition at an interval from each end thereof, a seat cushion in the box between the transverse partitions, means for supporting the cushion in both lowered and elevated positions at intervals above the floor of the box, a seat back having an apron pivotally secured to the box and adapted to form a cover therefor when lowered, the back and seat cushion being adapted when both are raised to form a seat of greater width than the box, folding arms at each end of the seat back adapted when the back is raised to extend substantially the width of the seat and when the back is lowered to lie between the ends of the box and transverse partitions, and means detachably securing the arms to the box when the back is raised.

7. A seat comprising a box, a pair of transverse partitions each separated from the end walls thereof by a narrow interval, blocks on the bottom of the box against the inner face of each transverse partition, plates each pivoted at its lower edge to the top of the block and normally spring projected at its upper edge from the face of the adjacent partition, a seat cushion adapted to rest when lowered on the blocks and when raised on the upper margins of said plates, a seat back having an apron pivoted to the box and adapted to form a cover therefor when lowered, the back and seat cushion when both are elevated being adapted to form a seat of greater width than the box, and folding arms on the back adapted when the latter is raised to extend the full width of the seat and when the back is lowered to lie between the transverse partitions and ends of the box.

8. A seat comprising a box, a seat cushion in the box, means for supporting the cushion in elevated position, a seat back having an apron pivotally secured to the box as a cover therefor when lowered, the box and seat cushion being adapted when both are elevated to form a seat of greater width than the box, arms each consisting of a panel extending forward from an end of the back and an extension hinged to the companion panel at its outer corner and adapted to fold against the upper edge of the panel in the plane thereof, means yieldingly retaining the extensions in extended and retracted position, and means detachably securing the extension to the box when the arm is extended.

9. A vehicle seat comprising a box having a rear wall whose margin lies below the margins of the end walls, a seat cushion the box, means for supporting the cushion with its face above the margin of the rear wall, a seat back having an apron at its lower end that is pivotally secured at its margin to the upper margin of the rear wall, the seat back and apron being adapted to form a cover for and continuation of the rear wall of the box when lowered and to form a seat with the elevated cushion of greater width than the box, and arms on the back adapted when the back is raised to extend the full width of the seat and when the back is lowered to lie wholly within the box.

10. A vehicle seat comprising a box having a rear wall whose upper margin is lower than the upper margin of the end walls of the box and a front wall whose upper margin is slightly lower than the upper margins of the end wall of the box, a seat cushion in the box adapted to be supported in elevated position above the planes of the upper margins of the rear and front walls of the box and a seat back having an apron on its rear margin whose lower edge is pivotally secured to the upper edge of the rear wall and whose forward edge is provided with a filler strip adapted to rest on the upper margin of the front wall of the box when the back is lowered, the back and seat cushion when raised being adapted to form a seat of greater width than the box.

11. A vehicle seat comprising a box, transverse partitions at an interval from each end wall thereof, means for supporting a seat, a back hinged to the box and adapted when lowered to form a cover therefor, a panel rigidly secured to each end of the back, an extension pivoted to each panel to swing in the plane thereof, the panel and extension entering the interval between the adjacent transverse partition and end wall when the back is raised and lying wholly within said interval when the back is lowered and a seat cushion between the transverse partitions adapted to be supported in elevated position when the back is raised, and means for detachably securing the extension to the box when the back is raised.

12. A vehicle seat comprising a box, a transverse partition near each end wall thereof, a seat back having an apron pivotally secured to the box and adapted to form a seat of greater width than the box and a cover therefor when lowered, panels each rigidly secured at its inner end to the back near the end thereof with its forward portion lying between the adjacent end wall and transverse partition, an extension pivoted to each panel to swing in the plane thereof and adapted when the back is raised to form with the companion panel a seat arm, means adapted to yieldingly maintain the extension in either extended or folded position, and means adapted to detachably secure the extension to the box as a support for the back when extended.

13. A vehicle seat comprising a box, transverse partitions each in parallel spaced relation to an end wall, a seat back having an apron pivoted to the box to form a seat of greater width than the box and a cover therefor when lowered, seat arms each consisting of a panel rigidly secured at its inner end to the back near the end thereof and an extension pivoted to the panel to swing in the plane thereof, the extension abutting the outer end of the panel when extended, a spring secured to the panel and the extension adapted to hold the extension in extended or folded position, a latch bar on the free end of the extension, a striking plate secured in the box and adapted to contact with the latch plate when the extension is in open position, a keeper in the latch plate adapted to engage the striking plate and transverse partitions each in spaced relation to an end wall with which the members of the arms are in sliding contact in all positions assumed by the back.

14. A vehicle seat comprising a box, a transverse partition at an interval from each end thereof, a seat back having an apron pivotally secured to the box and adapted to form a seat of greater width than the box and a cover therefor when lowered, seat arms at each end of the back each consisting of a panel rigidly secured at one end to the back near the end thereof and an extension pivotally secured to the panel to swing in the plane thereof, the lower margins of the panels and extensions being in sliding engagement with the box ends and transverse partitions when the back is raised, a latch plate on the forward lower corner of each extension, a striking plate in the box adapted to support the latch plate when the companion extension is in raised position, a keeper mounted on the latch plate adapted to enter a slot in the striking plate and springs each connecting a panel and a companion extension adapted to yieldingly hold the extension in extended or folded position.

15. In a seat, a seat back pivotally secured to the box and adapted to form a cover therefor when lowered, a panel rigidly secured at one end to the back near one end thereof an extension for the panel, a hinge consisting of a pair of plates pivoted together at their inner ends and secured to the margins of the panel and extension, tongues on the plates embedded in the panels and extensions, a spring secured at one end to a panel and at the other to the hinge plate of a mating extension and adapted to play in registering slots formed in the meeting margins of the panel and extension and in the hinge plates, a tenon on the extension adapted to enter the spring slot in the companion panel when the extension is in raised position, and flanges on the margins of the panel and extension in sliding contact with the adjacent end walls of the box.

16. A seat comprising a box having a rear wall whose upper margin is lower than the upper margins of the end walls, a transverse partition at an interval from each end of the box, a seat cushion in the box between the transverse partitions, means for supporting the cushion in both lowered and elevated position at intervals above the floor of the box, a seat back provided with an apron pivotally secured at its outer margin to the margins of the rear wall, the seat back apron and seat cushion being adapted to form a seat of greater width than the box when the back and seat cushion are in elevated positions, a panel rigidly secured to each end of the back and adapted to extend into the space between the adjacent end wall and transverse partition, a flange near the margin of the panel in sliding engagement with the adjacent transverse partition and end wall, an extension for the panel having a marginal flange in sliding engagement with the adjacent transverse partition and end wall and a tenon adapted to enter a longitudinal slot in the marginal portion of the panel against which the extension abuts when in raised position, a pair of hinge plates pivotally connected and secured to the upper margins of each pair of panels and extensions, a spring secured at one end in the slotted margin of the panel and at the other end to the hinge plate secured to the companion extension and adapted to play in said slot and in mating slots in the hinge plate and extension, striking plates secured in the box, a latch plate on the free end of each extension adapted to rest on the striking plate when the extension is in raised position, a keeper in the latch plate adapted to interlock with a slot in the striking plate when the latch plate and keeper plate are in contact, and means for retracting the cushion supporting means from the cushion when the latter is elevated.

17. A seat comprising a box, a transverse partition at an interval from each end thereof, transversely disposed blocks in the box adjacent the partitions, plates resting on the blocks having limited movement to and from the adjacent partitions, a seat cushion adapted when lowered to rest on the upper margins of the blocks and when raised to rest on the upper margins of the plates, springs yieldingly projecting the plates away from the partitions, a rear wall to the box whose margin lies below the upper plane of the seat cushion when the latter is raised, a back having an apron pivotally secured at its margin to the upper margin of the rear wall, the back being adapted to form with the cushion when both are elevated a seat wider than the box and when lowered to constitute a cover for the box, folding arms on each end of the seat back adapted when the latter is raised to extend the full width of the seat and to lie between the transverse partitions and the end walls when the back is lowered, means detachably connecting the extended arms and box when the back is raised, and means for retracting the plates from engagement with the cushion.

18. In a seat the combination of a box with cover therefor adapted to form a seat back when raised, a cushion adapted to fit within the box, and upright plates each pivotally secured at its lower margin in the box near the end of the cushion, end flanges on each plate adapted to support the plate with its upper edge inclined forwardly from the end wall of the box, spring members adapted to yieldingly hold the plates in inclined position for supporting the cushion, and an extension of an end flange on each plate for retracting the plate.

19. A vehicle seat comprising a box having a rear wall whose margin lies below the margins of the end walls, a seat cushion in the box, means for supporting the cushion with its face above the margin of the rear wall, a seat back having an apron at its lower end that is pivotally secured at its lower margin to the upper margin of the rear wall, the seat back and apron being adapted to form a cover for and continuation of the rear wall of the box when lowered and to form a seat with the elevated cushion of greater width than the box, arms on the back adapted when the back is raised to extend the full width of the seat and when the back is lowered to lie wholly within the box.

In testimony whereof I affix my signature in presence of two witnesses.

ARTHUR F. DRAPER.

Witnesses:
ANNA M. DORR,
OTTO F. BARTHEL.

---

Copies of this patent may be obtained for five cents each, by addressing the "Commissioner of Patents, Washington, D. C."